(No Model.)
G. H. GRAPES.
PUSH HOE.
No. 591,837. Patented Oct. 19, 1897.
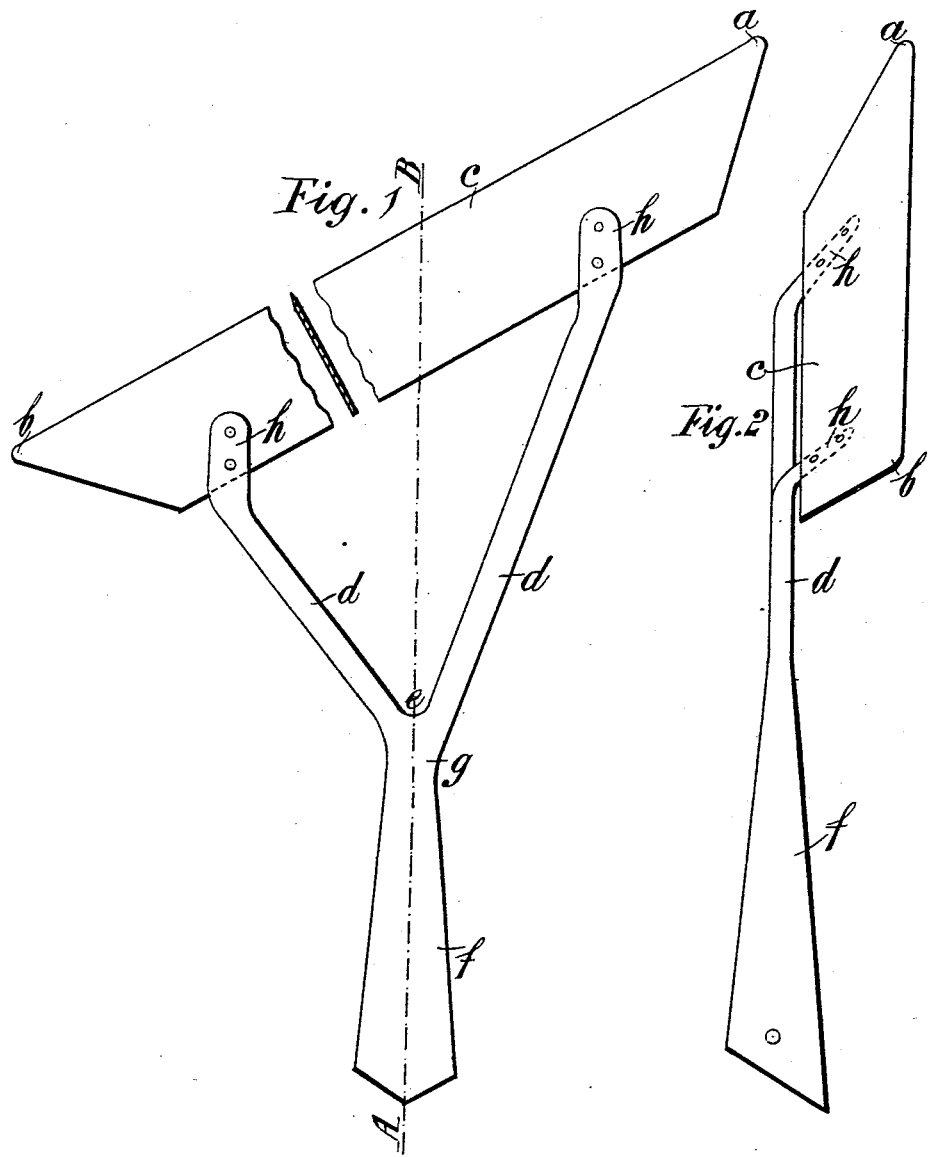
Witnesses
H. van Dewenneel
E. A. Scott
Inventor
George Hamilton Grapes
by
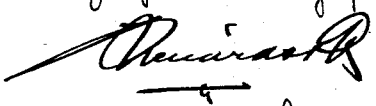
Attorneys

UNITED STATES PATENT OFFICE.

GEORGE HAMILTON GRAPES, OF PARAPARAUMU, NEW ZEALAND.

PUSH-HOE.

SPECIFICATION forming part of Letters Patent No. 591,837, dated October 19, 1897.

Application filed June 12, 1896. Serial No. 595,284. (No model.)

*To all whom it may concern:*

Be it known that I, GEORGE HAMILTON GRAPES, a subject of the Queen of Great Britain, residing at Beverley, Paraparaumu, in the provincial district of Wellington, in the Colony of New Zealand, have invented a new and Improved Push-Hoe; and I do hereby declare that the following is a full, clear, and exact description of the invention.

The object of my invention is to produce a hand push-hoe which is suitable for use in vineyards and orchards and as an adjunct to the horse cultivating implements employed thereon, the smaller-sized hoes being well adapted also for general farm and garden work, the points of the blade being exceedingly useful in working in and around plants.

Moreover, by my invention a hoe is provided which is nearly self-sharpening, is exceedingly light to use, and easy to manipulate, so that a greater amount of work can be performed in a given time. The blade of the hoe is in such a simple form that it can be easily renewed or repaired.

My invention consists in placing the blade of the hoe at about an angle of forty-five degree, more or less, to the direct line of thrust in such a manner that the same shall generally move horizontally beneath the surface of the soil when propelled, and that the said blade shall move in a diagonal direction to the line of thrust whenever an obstacle—such as a weed, stalk, or fruit-tree-root sucker—shall be opposed to its movement in a direction parallel to the line of thrust. To further facilitate this lateral or diagonal motion of the hoe-blade when in use, I construct the said blade with a forward point having an acute angle sharpened on both sides, and to lessen the weight of the hoe and facilitate its manufacture I make the rear point also in the form of a similar acute angle.

My invention is illustrated on the accompanying sheet of drawings, on which—

Figure 1 is a front view of my improved hoe, and Fig. 2 is a side view of the same.

Like letters indicate like parts in both the figures.

$c$ is a blade of thin steel, the form of which is shown in section, and the front edge $a\ b$ of which is sharpened to a chisel or cutting edge. This blade $c$ for the larger-sized hoes I prefer to be in length about thirteen inches, more or less, with a width of about two and one-fourth inches, the said blade being set at an angle of about forty-five degrees to the line of thrust A B. It is so fixed to the fork $e$ by the arms $d$ and projections $h$ that the distance from $c$ to $b$ is greater than the distance from $c$ to $a$, which counterbalances the tendency of a pointed hoe to pierce the ground at the point $a$.

$f$ is the socket to receive any usual and convenient handle, but which I prefer to be straight and in a direct line with the center of the socket $f$ and the arms $d$. It will be evident that the socket $f$ may be made in one piece with the blade $c$, though I prefer the blade being separate and formed of one piece of flat steel for simplicity; also, the edge might be serrated for some purposes. Moreover, I claim all such variations of my said invention as properly come within the scope of the same.

What I do claim as my invention, and desire to secure by Letters Patent, is—

In a hoe, a diagonally-placed cutting-blade, a handle, a socket therefor, diverging arms extending from the socket and arranged in the same plane with the handle, one of said arms being shorter than the other, the extreme ends of the arms being bent and secured to the blade, substantially as described.

GEORGE HAMILTON GRAPES.

Witnesses:
W. E. HUGHES,
E. S. BALDWIN.